(12) United States Patent
Bell

(10) Patent No.: X9645
(45) Date of Patent: May 14, 1836

(54) CANNON, TRAVERSE BOARD

(76) Inventor: William H. Bell

William H. Bell
Letters Patent
(357)

The Schedule referred to in these Letters Patent and mak-
ing part of the same containing a description in the words
of the said William H. Bell himself of his Improve-
ment in a traverse board for pointing Cannon —

If an oaken board about two inches in width and
three or four inches in depth be nailed horizontally fast
against the interior wall of a fortification (in which a gun is
mounted on its carriage in battery) in such manner that
when the axis of the carriage is perpendicular to the wall,
the centre of the board shall be in the vertical plane
through the axis of the carriage and shall be immediate-
ly over and almost touching the tongue of the carriage,
and if the board thus nailed fast have its rear or exte-
rior edge shaped into the curvature described (while the car-
riage traverses from the extreme right to the extreme left)
by a brass nail in the tongue of the carriage immediately
below and almost touching the board, and if this circular
edge of the board be divided into 15 or 20 principle di-
visions and each principle part into as many subdivisions
as may be convenient then, by means of the graduation on
the board and the brass edge (about 6 inches in length)
inserted in the centre of the tongue, which points to the
graduations any position at which the gun stands, (as to
horizontal range or traverse) may be known to the Cap-
tain of the gun at a glance of the eye since it will
be indicated at once by the point of graduation on the
board, at which the brass pointer stands. which for illus-
tration we will suppose to be at the traverse 10 ½" of the
graduation — Now if we suppose a battery of 10 guns
of of a fortified place to have each of their gun carriages
similarly supplied with their traverse boards furnished
with a corresponding graduation, it is plain. 1st That
every gun in the battery can by a single word of the Com-
mander be fired under the same angle of horizontal range
for example traverse 10° [illegible], and thus, if the object to
be battered be fixed and its position be ascertained dur-
ing the day, the firings may be continued by a dark
lantern with unabated energy during the whole night
or during the [illegible] day though the combatants be envel-
oped with smoke or mist — 2d If the object be moving
(as that of a frigate) in front of the battery of 10 guns fur-
nished as above with traverse boards, graduated in such
manner that the fire of the battery shall converge to the
centre, so as to cross at a distance of 1000 yards; then
by the aid of these boards and of the invention of the under-
signed for pointing cannon patented Dec. 8th 1829 the
commander placed on the ramparts where he can see the
moving frigate and the flight of his shot will be
enabled to follow the ship with his fire converging
upon her, and to make its whole force as he pleases, by
firing salvos to the right or to the left or farther or
nearer, to any desirable degree of exactness. 3d By
means of the moveable converging fire afforded by the
boards, and the other inventions referred to, the Comman-
der instead of being obliged to trust the firing to the
various and conflicting views of the different Captains
of Guns, will be enabled to apply the talents of the
best gunner to the firing of all the guns and may
throw his shot (when the traverse is graduated so that
they may cross at 1000 yards) to strike upon the side
of the frigate within the [illegible] space of 57 feet in 900
yards instead of being fired at random and scatter-
ing

United States Patent

Patent No.: X9645 over the whole ship: and at 800 yards he may throw
shot to strike within the space of 38 feet and at 900 to
1100 yards within the space of 19 feet and at 1200 yards
within the space of 57 feet &c &c Witnesses M. Adler — Wm. H. Bell Wm. M. Dawson — Capt. U. S. Army

[S. 9 W. 85] — Cannot be made